ᴜsᴏ11392796ʙ2

(12) United States Patent
Curewitz et al.

(10) Patent No.: US 11,392,796 B2
(45) Date of Patent: Jul. 19, 2022

(54) FEATURE DICTIONARY FOR BANDWIDTH ENHANCEMENT

(71) Applicant: Micron Technology, Inc., Boise, ID (US)

(72) Inventors: Kenneth Marion Curewitz, Cameron Park, CA (US); Ameen D. Akel, Rancho Cordova, CA (US); Hongyu Wang, Folsom, CA (US); Sean Stephen Eilert, Penryn, CA (US)

(73) Assignee: Micron Technology, Inc., Boise, ID (US)

( * ) Notice: Subject to any disclaimer, the term of this patent is extended or adjusted under 35 U.S.C. 154(b) by 385 days.

(21) Appl. No.: 16/545,854

(22) Filed: Aug. 20, 2019

(65) Prior Publication Data

US 2021/0056350 A1  Feb. 25, 2021

(51) Int. Cl.
  *G06K 9/62*  (2022.01)
  *G06F 13/16*  (2006.01)
  *G06N 3/08*  (2006.01)

(52) U.S. Cl.
  CPC ......... *G06K 9/6257* (2013.01); *G06F 13/161* (2013.01); *G06F 13/1668* (2013.01); *G06N 3/08* (2013.01)

(58) Field of Classification Search
  CPC combination set(s) only.
  See application file for complete search history.

(56) References Cited

U.S. PATENT DOCUMENTS

| | | | |
|---|---|---|---|
| 8,250,503 B2 * | 8/2012 | Vorbach | G06F 30/34 716/103 |
| 8,686,549 B2 * | 4/2014 | Vorbach | G06F 15/17375 257/777 |
| 8,819,505 B2 * | 8/2014 | Vorbach | G11C 29/78 714/724 |
| 8,914,590 B2 * | 12/2014 | Vorbach | G06F 12/0862 711/143 |
| 9,245,188 B2 | 1/2016 | Han | |
| 9,413,779 B2 | 8/2016 | Vasseur et al. | |
| 9,450,978 B2 | 9/2016 | Vasseur et al. | |
| 9,503,466 B2 | 11/2016 | Vasseur et al. | |
| 9,521,158 B2 | 12/2016 | Di Pietro et al. | |

(Continued)

FOREIGN PATENT DOCUMENTS

JP  2017126112  7/2017

OTHER PUBLICATIONS

Atoum, et al. "Monocular Video-Based Trailer Coupler Detection Using Multiplexer Convolutional Neural Network." IEEE International Conference on Computer Vision, Oct. 2017.

(Continued)

*Primary Examiner* — Omar S Ismail
(74) *Attorney, Agent, or Firm* — Greenberg Traurig

(57) ABSTRACT

A system having multiple devices that can host different versions of an artificial neural network (ANN) as well as different versions of a feature dictionary. In the system, encoded inputs for the ANN can be decoded by the feature dictionary, which allows for encoded input to be sent to a master version of the ANN over a network instead of an original version of the input which usually includes more data than the encoded input. Thus, by using the feature dictionary for training of a master ANN there can be reduction of data transmission.

18 Claims, 6 Drawing Sheets

(56) References Cited

U.S. PATENT DOCUMENTS

| | | | |
|---|---|---|---|
| 9,563,854 | B2 | 2/2017 | Cruz Mota et al. |
| 9,672,734 | B1 | 6/2017 | Ratnasingam |
| 9,751,534 | B2 | 9/2017 | Fung et al. |
| 9,947,145 | B2 | 4/2018 | Wang et al. |
| 10,001,760 | B1 | 6/2018 | Hoffmann et al. |
| 10,007,269 | B1 | 6/2018 | Gray |
| 10,019,654 | B1* | 7/2018 | Pisoni .................. G06K 9/6262 |
| 10,217,028 | B1 | 2/2019 | Wang et al. |
| 10,229,357 | B2 | 3/2019 | Jin et al. |
| 10,254,760 | B1 | 4/2019 | Abeloe |
| 10,275,851 | B1 | 4/2019 | Zhao et al. |
| 10,296,004 | B2 | 5/2019 | Nishi |
| 10,366,502 | B1 | 7/2019 | Li |
| 10,459,444 | B1 | 10/2019 | Kentley-klay |
| 10,599,546 | B1 | 3/2020 | Walther et al. |
| 10,611,379 | B2 | 4/2020 | Olabiyi et al. |
| 10,672,200 | B2 | 6/2020 | Wang et al. |
| 10,678,244 | B2 | 6/2020 | Iandola et al. |
| 10,713,955 | B2 | 7/2020 | Tong et al. |
| 10,733,506 | B1 | 8/2020 | Ogale et al. |
| 10,855,485 | B1* | 12/2020 | Zhou .................. H04L 51/16 |
| 10,915,663 | B1 | 2/2021 | Ferrer et al. |
| 10,994,741 | B2 | 5/2021 | Zhou et al. |
| 11,003,992 | B2 | 5/2021 | Wesolowski et al. |
| 11,120,353 | B2 | 9/2021 | Olabiyi et al. |
| 11,188,821 | B1* | 11/2021 | Kalakrishnan ......... B25J 9/1664 |
| 2013/0346350 | A1 | 12/2013 | Subramanian et al. |
| 2014/0201126 | A1* | 7/2014 | Zadeh .................. A61B 5/165 706/52 |
| 2015/0100530 | A1 | 4/2015 | Mnih et al. |
| 2015/0106308 | A1 | 4/2015 | Harrison et al. |
| 2015/0161454 | A1 | 6/2015 | Han |
| 2015/0193693 | A1 | 7/2015 | Vasseur et al. |
| 2015/0193694 | A1 | 7/2015 | Vasseur et al. |
| 2015/0193695 | A1 | 7/2015 | Cruz Mota et al. |
| 2015/0193696 | A1 | 7/2015 | Vasseur et al. |
| 2015/0193697 | A1 | 7/2015 | Vasseur et al. |
| 2015/0195145 | A1 | 7/2015 | Di Pietro et al. |
| 2015/0195146 | A1* | 7/2015 | Di Pietro .............. H04L 47/41 370/230 |
| 2015/0254555 | A1 | 9/2015 | Williams, Jr. et al. |
| 2015/0324686 | A1 | 11/2015 | Julian et al. |
| 2016/0020943 | A1 | 1/2016 | Diab et al. |
| 2016/0078339 | A1 | 3/2016 | Li et al. |
| 2017/0008168 | A1 | 1/2017 | Weng et al. |
| 2017/0008521 | A1 | 1/2017 | Braunstein et al. |
| 2017/0132527 | A1 | 5/2017 | Ahn et al. |
| 2017/0169208 | A1 | 6/2017 | Jantz et al. |
| 2017/0200284 | A1 | 7/2017 | Lee et al. |
| 2017/0242436 | A1 | 8/2017 | Creusot |
| 2017/0262735 | A1 | 9/2017 | Ros Sanchez et al. |
| 2017/0293808 | A1 | 10/2017 | Jain et al. |
| 2017/0305434 | A1 | 10/2017 | Ratnasingam |
| 2018/0018590 | A1* | 1/2018 | Szeto .................. G06N 20/10 |
| 2018/0018775 | A1* | 1/2018 | Piekniewski ......... G06T 7/0002 |
| 2018/0025268 | A1 | 1/2018 | Teig et al. |
| 2018/0053071 | A1* | 2/2018 | Chen .................. G06N 20/10 |
| 2018/0068206 | A1 | 3/2018 | Pollach et al. |
| 2018/0082137 | A1 | 3/2018 | Melvin et al. |
| 2018/0157920 | A1 | 6/2018 | Hu |
| 2018/0164825 | A1 | 6/2018 | Matus et al. |
| 2018/0173971 | A1 | 6/2018 | Jia et al. |
| 2018/0174023 | A1 | 6/2018 | Imam et al. |
| 2018/0174457 | A1 | 6/2018 | Taylor |
| 2018/0182187 | A1* | 6/2018 | Tong .................. G07C 5/10 |
| 2018/0188733 | A1 | 7/2018 | Iandola et al. |
| 2018/0284735 | A1* | 10/2018 | Celia .................. H04B 17/345 |
| 2018/0285735 | A1 | 10/2018 | Baum et al. |
| 2018/0292825 | A1 | 10/2018 | Smolyanskiy et al. |
| 2018/0300964 | A1 | 10/2018 | Lakshamanan et al. |
| 2019/0019082 | A1 | 1/2019 | Dasgupta et al. |
| 2019/0034762 | A1 | 1/2019 | Hashimoto |
| 2019/0035113 | A1* | 1/2019 | Salvi .................. G06T 9/002 |
| 2019/0050624 | A1* | 2/2019 | Chai .................. G06N 3/08 |
| 2019/0108651 | A1* | 4/2019 | Gu .................. G06V 10/955 |
| 2019/0113927 | A1 | 4/2019 | Englard et al. |
| 2019/0114530 | A1 | 4/2019 | Nishida et al. |
| 2019/0114672 | A1 | 4/2019 | Jacobs et al. |
| 2019/0121673 | A1 | 4/2019 | Gold et al. |
| 2019/0122006 | A1 | 4/2019 | Hurry et al. |
| 2019/0122109 | A1 | 4/2019 | Busch et al. |
| 2019/0138889 | A1* | 5/2019 | Jiang .................. G06T 7/251 |
| 2019/0147254 | A1 | 5/2019 | Bai et al. |
| 2019/0147298 | A1 | 5/2019 | Rabinovich et al. |
| 2019/0147331 | A1 | 5/2019 | Arditi |
| 2019/0163737 | A1 | 5/2019 | Zhou et al. |
| 2019/0171187 | A1* | 6/2019 | Celia .................. G06N 20/00 |
| 2019/0187706 | A1 | 6/2019 | Zhou et al. |
| 2019/0187707 | A1 | 6/2019 | Zheng et al. |
| 2019/0204088 | A1* | 7/2019 | Haque .................. G06N 3/02 |
| 2019/0205744 | A1 | 7/2019 | Mondello et al. |
| 2019/0205765 | A1 | 7/2019 | Mondello et al. |
| 2019/0251396 | A1 | 8/2019 | Geraci et al. |
| 2019/0258251 | A1 | 8/2019 | Ditty et al. |
| 2019/0354708 | A1 | 11/2019 | Fisher et al. |
| 2020/0005135 | A1 | 1/2020 | Che |
| 2020/0068250 | A1* | 2/2020 | Bhooi .................. H04N 21/4334 |
| 2020/0209810 | A1 | 7/2020 | Bazhenov et al. |
| 2020/0242466 | A1 | 7/2020 | Mohassel et al. |
| 2020/0257301 | A1* | 8/2020 | Weiser .................. G06N 3/02 |
| 2020/0279129 | A1 | 9/2020 | Batchelor et al. |
| 2020/0380629 | A1 | 12/2020 | Monteil et al. |
| 2020/0401136 | A1 | 12/2020 | Iandola et al. |
| 2021/0042630 | A1 | 2/2021 | Roberts et al. |
| 2021/0056387 | A1 | 2/2021 | Eilert et al. |
| 2021/0056405 | A1* | 2/2021 | Bradshaw ............ G06N 3/0454 |

OTHER PUBLICATIONS

Chen, et al. "Brain-Inspired Cognitive Model with Attention for Self-Driving Cars." Feb. 19, 2017.

Eraqi, et al. "End-toEnd Deep Learning for Steering Autonomous Vehicles Considering Temporal Dependencies." 31st Conference on Neural Information Processing Systems, Nov. 22, 2017.

Hou, et al. "Fast Recurrent Fully Convolutional networks for Direct Perception in Autonomous Driving." Nov. 20, 2017.

Liu, et al. "A Unified Cloud Platform for Autonomous Driving." IEEE Computer Society, Dec. 18, 2017.

Pan, et al. "Agile Off-Road Autonomous Driving Using End-to-End Deep Imitation Learning." Sep. 21, 2017.

Sallab, et al. "Meta Learning Framework for Automated Driving." Jun. 11, 2017.

Shapiro, Danny. "Accelerating the Race to Autonomous Cars." Aug. 2016.

Wang, et al. "Reconfigurable Processor for Deep Learning in Autonomous Vehicles." International Telecommunication Union, Sep. 2017.

International Search Report and Written Opinion, PCT/US2020/046155, dated Nov. 20, 2020.

International Search Report and Written Opinion, PCT/US2020/046159, dated Nov. 20, 2020.

Bojarski et al., "End to End Learning for Self-Driving Cars." arXiv:1604.07316v1, Apr. 25, 2016.

Fridman et al., "MIT Autonomous Vehicle Technology Study: Large-Scale Deep Learning Based Analysis of Driver Behavior and Interaction with Automation" arXiv:1711.06976v1, Nov. 19, 2017.

International Search Report and Written Opinion, PCT/US2020/046157, dated Jan. 15, 2021.

Ji Wang, et al., "Not Just Privacy: Improving Performance of Private Deep Learning in Mobile Cloud," arXiv:1809.03428v3, Jan. 5, 2019.

Linshan Jiang, et al., "Differentially Private Collaborative learning for the IoT Edge," EWSN '19: Proceedings of the 2019 International Conference on Embedded Wireless Systems and networks, Mar. 2019.

Pan et al., "Virtual to Real Reinforcement Learning for Autonomous Driving." arXiv:1704.03952v3, May 11, 2017.

Santana et al., "Learning a Driving Simulator." arXiv:1608.01230v1, Aug. 3, 2016.

(56) References Cited

OTHER PUBLICATIONS

Stern et al., "Dissipation of stop-and-go waves via control of autonomous vehicles: Field experiemnts." ARxIV:1705.01693V1, May 4, 2017.
Teichmann et al., "MultiNet: Real-time Joint Semantic Reasoning for Autonomous Driving." arXiv:1612.07695v1, Dec. 22, 2016.
Tianwei Zhang, et al., "Privacy-preserving Machine Learning through Data Obfuscation," arXiv: 1807.01860v2, Jul. 13, 2018.
Vishal Anjaiah Gujjary, et al., "Letters: A neural network approach for data masking," Neurocomputing 2011, vol. 74, No. 9, Apr. 2011.
International Search Report and Written Opinion, PCT/US2018/063669, dated Mar. 25, 2019.
Jin et al., "How to scale distributed deep learning?" arXiv1611.04581.v1, Nov. 14, 2016.
Olabiyi et al., "Driver Action Prediction Using Deep (Bidirectional) Recurrent Neural Network." arXiv:1706.02257, Jun. 7, 2017.
Skende, Andi, "Introducing 'Parker' Next-Generation Tegra System-On-Chip." Aug. 2016.
Wu et al., "SqueezeDet: Unified, Small, Low Power Fully Convolutional Neural Networks for Real-Time Object Detection for Autonomous Driving." arXiv:1612.01051v3, Nov. 29, 2017.
Aljosa Osep, et al. "Large-Scale Object Discovery and Detector Adaptation from Unlabeled Video" arXiv:1712.08832v1, Dec. 23, 2017.
Chelsea Finn, et al. "Generalizing Skills with Semi-Supervised Reinforcement Learning." Conference paper at ICLR, 2017.
David Stavens, et al. "A Self-Supervised Terrain Roughness Estimator for Off-Road Autonomous Driving." arXiv:1206.6872, Jun. 27, 2012.
Evan Shelhamer, et al. "Loss is its own Reward: Self-Supervision for Reinforcement Learning." arXiv:1612.07307, Mar. 9, 2017.
Guy Rosman, et al. "Hybrid Control and Learning with Coresets for Autonomous Vehicles." IEEE/RSJ International Conference on Intelligent Robots and Systems (IROS), IEEE, Sep. 24-28, 2017.
Junhong Xu, et al. "Avoidance of Manual Labeling in Robotic Autonomous Navigation Through Multi-Sensory Semi-Supervised Learning." arXiv:1709.07911v3, Oct. 9, 2017.
Miguel A. Bautista, et al. "Learning Where to Drive by Watching Others." German Conference on Pattern Recognition, Aug. 15, 2017.
Mohammed Abdulla Yousuf, et al. U.S. "Systems and Methods for Safe and Reliable Autonomous Vehicles." U.S. Appl. No. 62/584,549, filed Nov. 10, 2017.
Xiaohang Zhan. "Mix-and-Match Tuning for Slef-Supervised Semantic Segmentation." Association for the Advancement of Artificial Intelligence (AAAI), 2018.
Yiran Zhong, et al. "Self-Supervised Learning for Stereo matching with Self-Improving Ability." arXiv:1709.00930v1, Sep. 4, 2017.

* cited by examiner

FEATURE DICTIONARY FOR BANDWIDTH ENHANCEMENT

FIELD OF THE TECHNOLOGY

At least some embodiments disclosed herein relate to distributed machine learning with data privacy protection and bandwidth enhancement in general, and more particularly, to distributed artificial neural networks with data privacy protection and bandwidth enhancement.

BACKGROUND

Artificial neural networks (ANN) are computing systems that can learn to perform tasks without being programmed with instructions for specific operations. An ANN is based on a set of connected nodes or artificial neurons, which are somewhat analogous to neurons in a biological brain. Each connection between nodes can transmit a signal from one artificial neuron to another, and an artificial neuron that receives a signal can process it.

Usually, an ANN is implemented by a signal at a connection (or edge) between artificial neurons being a real number, and the output of each artificial neuron being computed by a non-linear function of the sum of its inputs. Artificial neurons and edges usually have a weight that adjusts as learning by the ANN or training of the ANN proceeds. The weight increases or decreases the strength of the signal at an edge. An artificial neuron can also have a threshold in which a signal is only sent from the artificial neuron if the aggregate signal exceeds the threshold. Usually, artificial neurons are grouped into layers (such as an input layer, one or more middle layers, and an output layer), and each layer can provide a different transformation on inputs to the layer.

With the increasing use of complex artificial neural networks, such as deep neural networks, and the desire to increase the effectiveness of such networks, complexities and challenges have been met by distributing training of artificial neural networks using multiple processors and/or distributed computing. However, with the use of multiple processors or distributing computing there are data privacy concerns (e.g., concerns that the data is authentic) as well as network performance concerns (e.g., concerns with network performance limiting ability for a neural network to meet performance needs of an application).

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
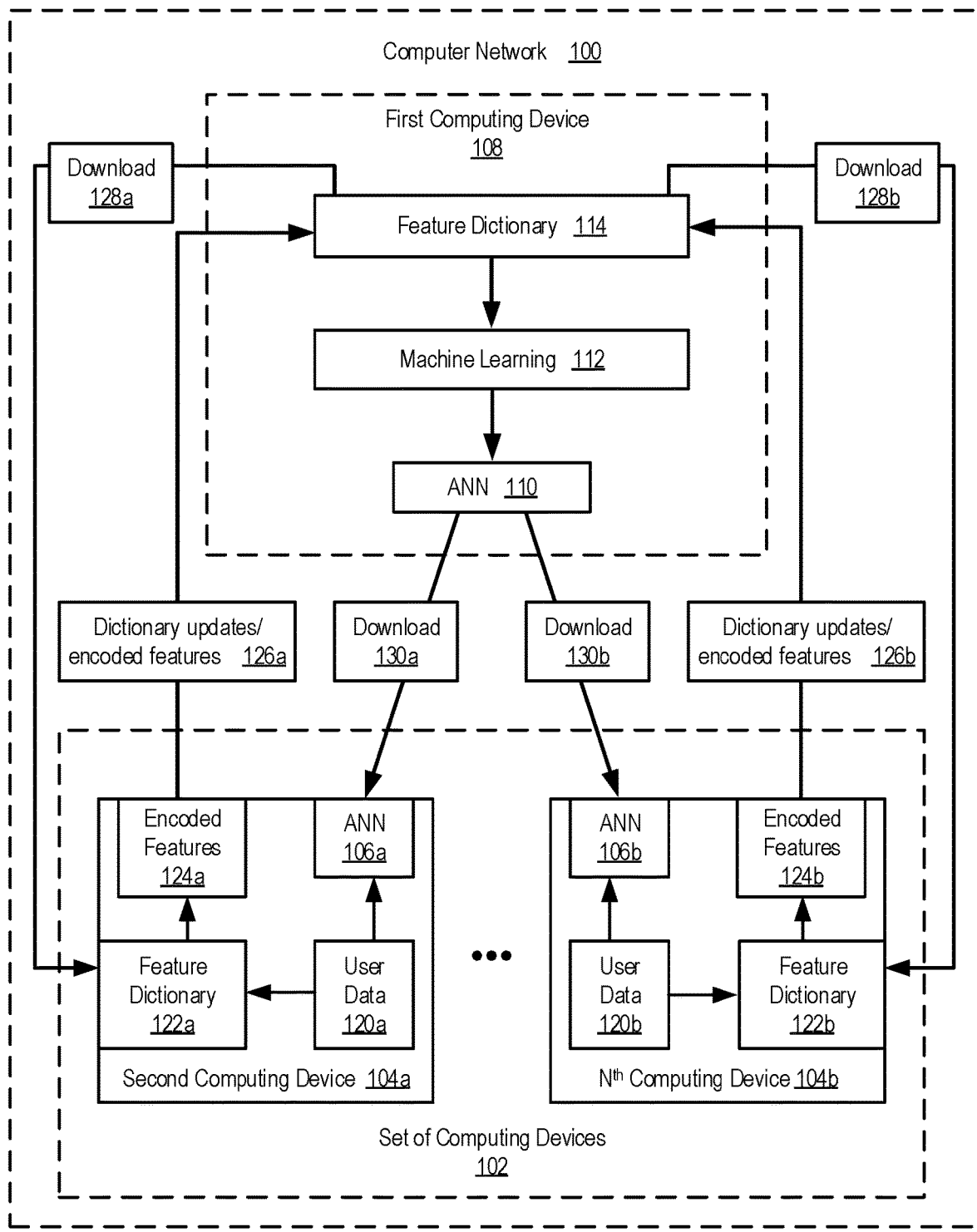
FIGS. 1 and 2 illustrate an example computer network 100 in a configuration to implement use of a feature dictionary for centralized training of an artificial neural network (ANN) and reduction of data transmission, in accordance with some embodiments of the present disclosure.

At least some aspects of the present disclosure are directed to distributed machine learning with data privacy protection and bandwidth enhancement in general, and more particularly, to distributed artificial neural networks with data privacy protection and bandwidth enhancement. Also, at least some aspects of the present disclosure are directed to a computer network that can be configured to implement using of a feature dictionary for centralized training of an artificial neural network (ANN) and reduction of data transmission.

Disclosed herein is a system that can have multiple computing devices that can host different versions of an ANN. Each computing device of the system can host its own version of the ANN. For example, a first device can host a master version of the ANN, and a second device and other devices of the system can host local versions of the ANN. Also, disclosed herein is a system that can have multiple devices that can host different versions of the ANN as well as different versions of a feature dictionary. In the system, inputs for a master version of the ANN can be encoded in one of the multiple devices hosting a local version of the ANN (such as the second computing device). The encoded inputs (which are encoded inputs which are defined by a local version of the feature dictionary) can then be sent to a master computing device hosting the master version of the ANN (such as the first computing device). In the master computing device, the sent encoded features can be decoded according to a master version of the feature dictionary. This allows for encoded input to be sent to a master version of the ANN over a network instead of an original version of the input which usually includes more data than the encoded input. Thus, by using the feature dictionary for training of a master ANN, there can be reduction of data transmission.

In the system, the computing devices hosting the local versions of the ANN and the local versions of the feature dictionary can extract selected features from user data stored on the devices and use a data compression algorithm to encode the extracted features from the user data. With the encoding, the data compression algorithm can provide pairs of extracted features and corresponding encoded features (such as codewords). The pairs can be included in the feature dictionary as definitions. The pairing of the original extracted data with its corresponding encoded data can be used to create or recreate the feature dictionary. Thus, the local versions of the feature dictionary provide definitions, in the pairings, for the encoded data. These pairings or definitions allow the encoded data to be decoded into its corresponding original data, such as by a master version of the feature dictionary. Also, the local versions of the feature dictionary can be used to update the master version of the feature dictionary. And, the data compression algorithm can be varied in its degree of compression to vary the reduction of data transmission.

In the system, with the sending of the user data from one of the computing devices hosting the local versions of the ANN and dictionary to the computing device hosting the master versions of the ANN and dictionary, instead of sending a full description of a feature of the user data (such as uncompressed user data) a codeword can be sent. Each time the feature is sent to the computing device hosting the master versions of the ANN and dictionary, a codeword for the feature can be defined in the local version of the feature dictionary and sent accordingly, such that only the corresponding codeword is transmitted over the network. In some embodiments, a definition pairing the codeword and the feature is only transmitted to the computing device hosting the master version of the feature dictionary when the definition is newly generated or updated in the local version of the feature dictionary—such as generated or updated via the data compression algorithm. This is when both updates to the feature dictionary and the encoded features are sent together. Otherwise, only the encoded features are sent since the master version of the dictionary includes the same definitions as the local versions.

The computing device hosting the master version of the ANN and the master version of the feature dictionary can look up a feature from the master version of the dictionary using the transmitted codeword. And, the computing device can then decode the codeword according to the master version of the dictionary and use the decoded feature for training the master version of the ANN via machine learning.

In some embodiments, the system described herein can include a first computing device hosting a master version of an ANN and a master version of a feature dictionary as well as a second computing device hosting a local version of the ANN and local version of the feature dictionary. And, the second computing device can be one of many computing devices that can host a different local version of the ANN and a different local version of the feature dictionary. The first computing device can be communicatively coupled to the second computing device, and can include memory configured to store the master version of the ANN, and store the master version of the feature dictionary. The first computing device can also include a transceiver configured to receive encoded features from the second computing device. The first computing device can also include a processor configured to: decode the received encoded features according to the master version of the feature dictionary, and train the master version of the ANN based on the decoded features using machine learning. The second computing device can include memory configured to store user data, store a local version of the ANN, and store the local version of the feature dictionary. The second computing device can also include a processor configured to: extract features from the stored user data, and encode the extracted features according to the local version of the feature dictionary. The second computing device can also include a transceiver configured to transmit the encoded features to the first computing device so that the encoded features are decoded by the master version of the feature dictionary and then used as input to train the master version of the ANN using the machine learning.

Additionally, in some embodiments, such as via the encoding, inputs for centralized training of the master version of the ANN can be obfuscated. For example, during or prior to the encoding of the features, the features can be obfuscated. The obfuscation can occur at any one of the multiple computing devices that host different versions of the ANN such as devices hosting local versions of the ANN. For example, the second computing device in the system can include memory that is configured to store a local version of the ANN and user data for inputting into the local version of the ANN. The second computing device can also include a processor that is configured to extract features from the user data and obfuscate the extracted features to generate obfuscated user data during or prior to the encoding of the extracted features. The second device also can include a transceiver that is configured to transmit the obfuscated/encoded user data such as to the first computing device. The first computing device can include a memory that is configured to store the master version of the ANN, a transceiver that is configured to receive obfuscated/encoded user data transmitted from the second computing device or another device of the system hosting a local version of the ANN, and a processor that is configured to train the master version based on the received obfuscated/encoded user data using machine learning after the received obfuscated/encoded user data has been decoded by the master version of the feature dictionary.

In some embodiments, one of the devices hosting a local version of the ANN can input user data, stored in its memory, into the local version of the ANN to use and train the local version of the ANN. For example, this can occur in a mobile device of the user. User data, which may include sensitive or private information, is not shared with other devices in its use with the ANN. To put it another way, the machine learning for the ANN can occur locally and privately in that the user data is not shared with other devices and is secured in the device of the user. However, when the user data is shared with other devices for training of other versions of the ANN, such as a master version, the user data can be obfuscated and/or encoded before it is shared. The obfuscation further secures the privacy of the data and the encoding allows for less network bandwidth to be used since the encoded data is usually smaller than the original data. In some embodiments, only unique local data can be transmitted to the device that hosts the master version of the ANN, so the data transfer size is a subset of the original data.

In some embodiments, one or more devices hosting the master version of the ANN can be part of a cloud computing environment. And, in such embodiments, by obfuscating and/or encoding the user data only in the device of the user, the user data can be kept private from other devices in the cloud. Also, data transmissions can be decreased because of the encoding outputting small data sets. The unmasked or pre-encoded user data can be used to locally train a local version of the ANN on the device of the user. For example, the original user data can be used to train a local version of the ANN on a user's mobile device (e.g., the user's smart phone, tablet, etc.). When it is shared in the system for training of other versions of the ANN it is always at least encoded by the system and sometimes obfuscated as well during or prior to the encoding depending on the embodiment.

In some embodiments, the master version of the ANN can be downloaded to the individual devices of users to update and improve the local versions of the ANN stored on the devices. This can improve the accuracy of the locally stored versions of the ANN in areas of the ANN that may have not been improved by training locally alone. Also, the downloaded master version of the ANN can be further trained locally for a customized version of the ANN for the user. The benefit of this is that when the ANN is locally trained on the user device, the data input does not need to be encoded or obfuscated.

In general, in the computer network that can be configured to implement using of a feature dictionary for centralized training of an ANN and reduction of data transmission, devices that host the differently trained version of the ANN can perform local training to avoid the transmission of user data (which can be large in size) unless the user data is at least encoded by a feature dictionary before transmission (which can reduce the size of the data transmitted significantly). In that in some embodiments only encoded user data can be transmitted over a network communicatively coupling the devices of the network. A central device, server, or cloud can then receive the encoded user data via the network, decode it, and use the decoded data to train the master version of the ANN with limiting use of network bandwidth and in some embodiments without compromising data privacy. Since the central device, server, or cloud does not receive the original user data (such as inputs to local versions of ANN) over the network, trafficking bulky original user data over the network to the central device, server, or cloud and the network can be avoided.

The ANN updated in the computer network can be in the form of updating neuron attributes and/or connectivity. Changes to versions of the ANN can be done through training using compatible machine learning techniques where the input is or at least includes decoded user data that was encoded for improving network communications. Also, the input can be obfuscated during or before the encoding process; however, the obfuscated user data is not obfuscated beyond a point that updating neuron attributes and/or connectivity using the obfuscated input is detrimental to the effectiveness of the ANN in making expected predictions.

Figure 2:
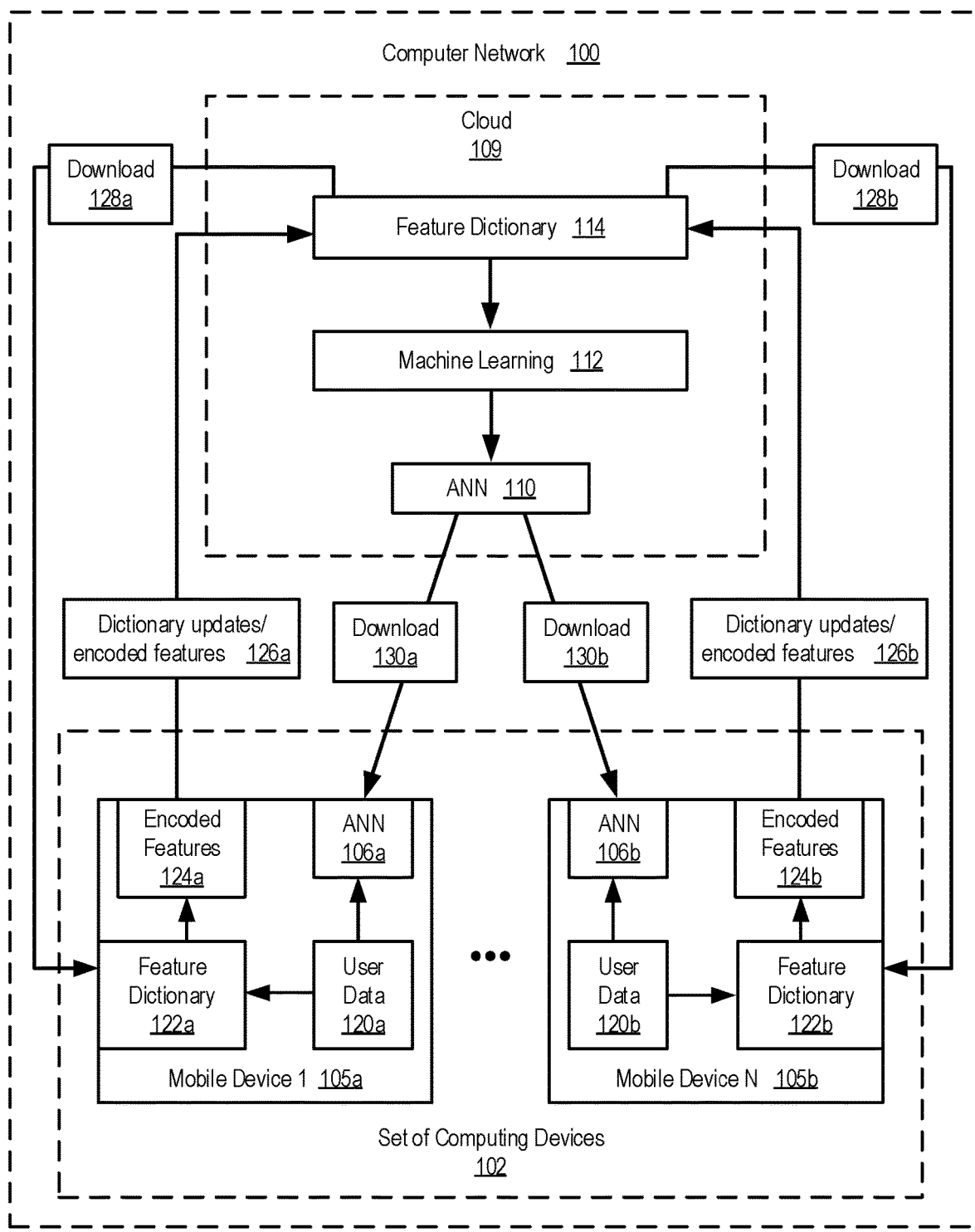

FIGS. 1 and 2 illustrate the computer network 100 in a configuration to implement using a feature dictionary for centralized training of an ANN and reduction of data transmission, in accordance with some embodiments of the present disclosure.

In FIG. 1, the computer network 100 is shown including a set of computing devices 102. The set of computing devices 102 can include one or more of any type of computing device capable of hosting and executing a version of an ANN, such as any type of mobile device, personal computer, or smart device that is capable of hosting and executing a version of an ANN (e.g., see second computing device 104a and Nth computing device 104b). Each computing device of the set of computing devices 102 can host and execute a local version of an ANN (e.g., see second computing device 104a and Nth computing device 104b having respective local versions of an ANN 106a and 106b).

The computer network 100 is also shown including a first computing device 108. The first computing device 108 can be a single computing device or multiple computing devices distributed over a network, such as distributed over a network of a cloud computing environment. The single computing device or the multiple computing devices embodied by first computing device 108 can include a master version of an ANN 110. The first computing device 108 can be the central device, server, or cloud or a selected device in a peer-to-peer computing network depending on the implementation of the computer network 100.

To put it another way, FIG. 1 illustrates computer network 100 including the set of computing devices 102 having networked computing devices (e.g., see computing devices 104a and 104b), wherein each networked computing devices stores and uses a separate local version of an ANN (e.g., see the local versions of the ANN 106a and 106b). The computer network 100 also includes the first computing device 108 (which can be part of a cloud or another type of distributed computing network). The first computing device 108 includes the master version of the ANN 110.

The local versions of the ANN (e.g., see the local versions of the ANN 106a and 106b) can be used with user data (e.g., see user data 120a and 120b). Also, user data can be used in training the local versions of the ANN.

Encoded, transmitted, and then decoded user data can be use by the master version of the ANN 110 (e.g., see the path of the user data 120a and 120b via the encoded features 124a and 124b and the master version of the feature dictionary 114) such as for training of the master version. An updated master version of the ANN can then be downloaded by one or more devices of the set of computing devices 102 (e.g., see downloading 130a and 130b). The downloaded master version can replace a local version of the ANN or be combined with the local version of the ANN hosted by one of the devices of the set of computing devices 102.

In the computer network 100, the computing devices hosting the local versions of the ANN and the local versions of the feature dictionary (e.g., see the computing devices of the set of computing devices 102) can extract selected features from user data stored on the devices (e.g., see user data 120a and 120b) and use a data compression algorithm to encode the extracted features from the user data (e.g., see encoded features 124a and 124b). With the encoding, the data compression algorithm can provide pairs of extracted features and corresponding encoded features (such as codewords). The pairs can be included in the feature dictionary as definitions (e.g., see versions of the feature dictionary 122a, 122b, and 114). The pairing of the original extracted data with its corresponding encoded data can be generated into a local feature dictionary (e.g., see local versions of the feature dictionary 122a and 122b). Thus, the local versions of the feature dictionary (e.g., see local versions of the feature dictionary 122a and 122b) provide definitions, in the pairings, for the encoded data (e.g., see encoded features 124a and 124b). These pairings or definitions allow the encoded data to be decoded into its corresponding original data, such as by a master version of the feature dictionary (e.g., see the master version of the feature dictionary 114). Also, the local versions of the feature dictionary (e.g., see local versions of the feature dictionary 122a and 122b) can be used to update the master version of the feature dictionary (e.g., see the master version of the feature dictionary 114). And, the data compression algorithm can be varied in its degree of compression to vary the reduction of data transmission.

In the computer network 100, with the sending of the user data from one of the computing devices hosting the local versions of the ANN and dictionary to the computing device hosting the master versions of the ANN and dictionary (e.g., see dictionary updates/encoded features 126a and 126b), instead of sending a full description of a feature of the user data (such as uncompressed user data) a codeword can be sent. Each time the feature is sent to the computing device hosting the master versions of the ANN and dictionary (e.g., see first computing device 108), a codeword for the feature can be defined in the local version of the feature dictionary (e.g., see local versions of the feature dictionary 122a and 122b) and sent accordingly, such that only the corresponding codeword is transmitted over the network (e.g., dictionary updates/encoded features 126a and 126b can sometimes only include encoded features). In some embodiments, a definition pairing the codeword and the feature is only transmitted to the computing device hosting the master version of the feature dictionary when the definition is newly generated or updated in the local version of the feature dictionary—such as generated or updated via the data compression algorithm. This is when both updates to the feature dictionary and the encoded features are sent together (e.g., dictionary updates/encoded features 126a and 126b can sometimes include encoded features as well as corresponding definitions). Otherwise, only the encoded features are sent since the master version of the dictionary includes the same definitions as the local versions.

The computing device hosting the master version of the ANN and the master version of the feature dictionary (e.g., see first computing device 108) can look up a feature from the master version of the dictionary (e.g., see the master version of the feature dictionary 114) using the transmitted codeword (e.g., see dictionary updates/encoded features 126a and 126b). And, the computing device can then decode the codeword according to the master version of the dictionary and use the decoded feature for training the master version of the ANN via machine learning (e.g., see the master version of the ANN 110 and machine learning 112).

The master version of the ANN (e.g., see the master version of the ANN 110) can be trained over and over again by received feature dictionary updates and encoded data (e.g., see the dictionary updates/encoded features 126a and 126b) via machine leaning (e.g., see machine learning 112) such that the master version is generic and becomes more and more accurate over time. The data can be received from the devices of different users having the different and local versions of the ANN (e.g., see local versions of the ANN 106a and 106b) and different stored user data (e.g., see user data 120a and 120b). The master version of the ANN (e.g., see the master version of the ANN 110) can be downloaded to the individual user devices (e.g., see computing devices 104a and 104b) to update the user devices capability to benefit from advances in areas that may not have been trained locally (e.g., see downloading 130a and 130b). Also, the downloaded ANN can be further trained locally for a customized version of the ANN for the user.

Not shown, the computer network 100 includes a communications network that includes a wide area network (WAN), a local area network (LAN), an intranet, an extranet, the Internet, and/or any combination thereof. The communications network can communicatively couple the devices of the set of computing devices 102 with each other and with other devices of the computer network 100 such as with the first computing device 108. The sent feature dictionary updates and encoded user data as well as the downloads of the master version of the ANN mentioned herein (e.g., see the dictionary updates/encoded features 126a and 126b and downloading 130a and 130b) can be communicated or transmitted over the communications network of the computer network 100. Also, updates to the master version of the feature dictionary mentioned herein (e.g., see downloading 128a and 128b) can be communicated or transmitted over the communications network of the computer network 100.

FIG. 2 is somewhat similar to FIG. 1 in that it shows computer network 100 in a configuration to implement using of a feature dictionary for centralized training of an ANN and reduction of data transmission. However, different from FIG. 1, FIG. 2 depicts specifically the set of computing devices 102 including mobile devices (e.g., see mobile devices 105a and 105b) hosting respective local versions of the ANN (e.g., see the local versions of the ANN 106a and 106b). Also, in FIG. 2, it is shown that a cloud computing environment (e.g., cloud computing environment 109) is hosting the master version of the ANN (e.g., see the master version of the ANN 110). In other words, FIG. 2 is a more specific implementation of the computer network shown in FIG. 1, where the first device 108 is or is part of the cloud computing environment 109 and the devices of the set of computing devices 102 are specifically mobile devices (e.g., see mobile devices 105a and 105b).

In some embodiments, a system for implementing use of a feature dictionary for centralized training of an ANN and reduction of data transmission can include a plurality of computing devices (e.g., see set of computing devices 102). Each one of the plurality of computing devices can be configured to host a local version of the ANN (e.g., see local versions of the ANN 106a and 106b) and host a local version of the feature dictionary (e.g., see local versions of the feature dictionary 122a and 122b). The system can also include a first computing device (e.g., see first computing device 108 or cloud computing environment 109) configured to host a master version of the ANN (e.g., see the master version of the ANN 110) and host a master version of the feature dictionary (e.g., see the master version of the feature dictionary 114).

For example, the plurality of computing devices can include a second computing device (e.g., see computing devices 104a and 104b as well as mobile devices 105a and 105b) which can host the local version of the ANN (e.g., see local versions of the ANN 106a and 106b) and host the local version of the feature dictionary (e.g., see local versions of the feature dictionary 122a and 122b). And, the first computing device (e.g., see first computing device 108 or cloud computing environment 109) can be communicatively coupled to the second computing device over a computer network (e.g., see computer network 100).

The first computing device (e.g., see first computing device 108 or cloud computing environment 109) can include memory (e.g., see main memory 608 and storage system 612 shown in FIG. 6) configured to: store the master version of the ANN (e.g., see the master version of the ANN 110); and store the master version of the feature dictionary (e.g., see the master version of the feature dictionary 114). The first computing device can also include a transceiver (e.g., see network interface 610 shown in FIG. 6) configured to receive encoded features from the second computing device (e.g., see encoded features 124a and 124b as well as dictionary updates/encoded features 126a and 126b). Also, the first computing device (e.g., see first computing device 108 or cloud computing environment 109) can include a processor (e.g., see processor 606 shown in FIG. 6) configured to: decode the received encoded features according to the master version of the feature dictionary (e.g., see the master version of the feature dictionary 114); and train the master version of the ANN (e.g., see the master version of the ANN 110) based on the decoded features using machine learning (e.g., see machine learning 112).

In some embodiments, the transceiver (e.g., see network interface 610) of the first computing device (e.g., see first computing device 108 or cloud computing environment 109) can be configured to transmit the trained master version of the ANN to the second computing device (e.g., see computing devices 104a and 104b as well as mobile devices 105a and 105b), such as shown by downloading 130a and 130b. Also, the transceiver (e.g., see network interface 610) of the first computing device can be configured to receive the local version of the feature dictionary from the second computing device (e.g., see encoded features 124a and 124b as well as dictionary updates/encoded features 126a and 126b). In such an example, the processor (e.g., see processor 606) of the first computing device can be configured to: change the master version of the feature dictionary (e.g., see the master version of the feature dictionary 114) based on the received local version of the feature dictionary (e.g., see local versions of the feature dictionary 122a and 122b as well as dictionary updates/encoded features 126a and 126b); and decode the received encoded features according to the changed master version of the feature dictionary (e.g., see the master version of the feature dictionary 114). Also, the transceiver (e.g., see processor 606) of the first computing device can be configured to transmit the changed master version of the feature dictionary to the second computing device (e.g., see downloading 128a and 128b).

The second computing device (e.g., see computing devices 104a and 104b as well as mobile devices 105a and 105b) can include memory (e.g., see main memory 608 and storage system 612) configured to: store user data (e.g., see user data 120a and 120b); store a local version of the ANN (e.g., see local versions of the ANN 106a and 106b); and store a local version of the feature dictionary (e.g., see local versions of the feature dictionary 122a and 122b). The second computing device can also include a processor (e.g., see processor 606) configured to: extract features from the stored user data (e.g., see user data 120a and 120b); and encode the extracted features according to the local version of the feature dictionary (e.g., see local versions of the feature dictionary 122a and 122b and encoded features 124a and 124b). Also, the second computing device can include a transceiver (e.g., see network interface 610 shown in FIG. 6) configured to transmit the encoded features (e.g., see encoded features 124a and 124b) to the first computing device so that the encoded features are decoded by the master version of the feature dictionary (e.g., see the master version of the feature dictionary 114) and then used as input to train the master version of the ANN using the machine learning (e.g., see machine learning 112).

In some embodiments, the processor (e.g., see processor 606) of the second computing device (e.g., see computing devices 104a and 104b as well as mobile devices 105a and 105b) can be further configured to determine whether the extracted features are included in the local version of the feature dictionary (e.g., see local versions of the feature dictionary 122a and 122b). And, in response to the local version of the feature dictionary including the extracted features, the processor of the second computing device can be further configured to encode the extracted features according to the local version of the feature dictionary (e.g., see encoded features 124a and 124b). In response to the local version of the feature dictionary not including the extracted features, the processor of the second computing device can be further configured to change the local version of the feature dictionary based on the extracted features and then encode the extracted features according to the changed local version of the feature dictionary (e.g., see dictionary updates/encoded features 126a and 126b).

In such examples, the transceiver (e.g., see network interface 610) of the second computing device (e.g., see computing devices 104a and 104b as well as mobile devices 105a and 105b) can be configured to transmit the changed local version of the feature dictionary to the first computing device so that the master version of the feature dictionary is changed according to the local version of the feature dictionary (e.g., see dictionary updates/encoded features 126a and 126b). Also, the transceiver of the second computing device can be configured to receive the changed master version of the feature dictionary (e.g., see downloading 128a and 128b). In such embodiments, a processor (e.g., see processor 606) of the second computing device can be configured to change the local version of the feature dictionary (e.g., see local versions of the feature dictionary 122a and 122b) based on the changed master version of the feature dictionary (e.g., see the master version of the feature dictionary 114).

Additionally, in some embodiments, the transceiver (e.g., see network interface 610) of the second computing device (e.g., see computing devices 104a and 104b as well as mobile devices 105a and 105b) can be configured to receive the trained master version of the ANN (e.g., see downloading 130a and 130b). In such embodiments, the processor (e.g., see processor 606) of the second computing device can be configured to change the local version of the ANN (e.g., see local versions of the ANN 106a and 106b) based on the trained master version of the ANN (e.g., see the master version of the ANN 110 and downloading 130a and 130b).

Figure 3:
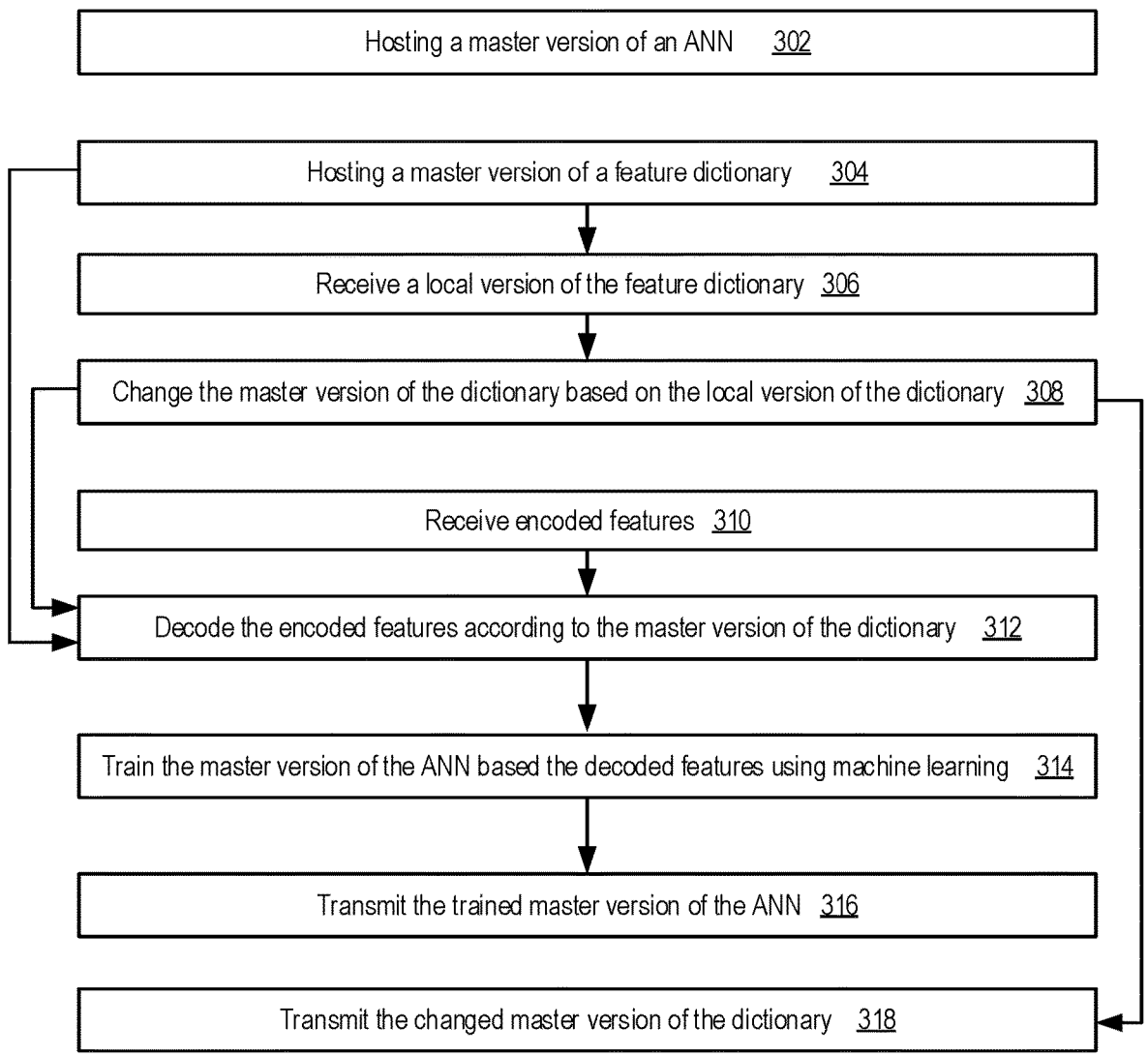
FIGS. 3 to 5 illustrate example methods performed by example parts of the computer network 100 that can implement use of a feature dictionary for centralized training of an ANN and reduction of data transmission, in accordance with some embodiments of the present disclosure.
Figure 4:
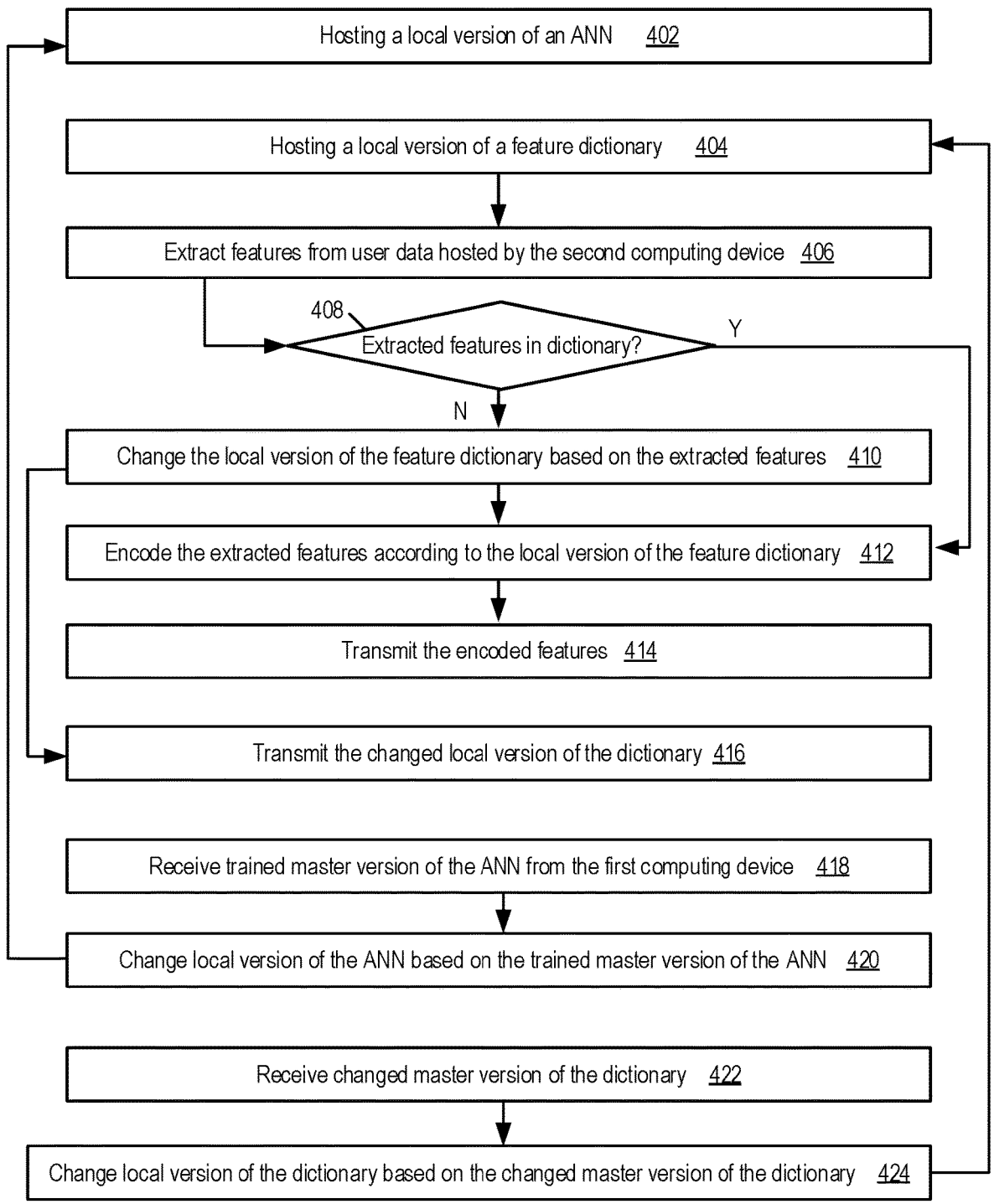

FIGS. 3 and 4 illustrate example methods performed by example parts of computer network 100 that can implement using of a feature dictionary for centralized training of an ANN and reduction of data transmission, in accordance with some embodiments of the present disclosure.

FIG. 3 shows the method 300 performed by a computing device configured to host a master version of an ANN and use of a feature dictionary for centralized training of the ANN and reduction of data transmission (e.g., see first computing device 108 or cloud computing environment 109) that is in communication with other computing devices that host other versions of the ANN (e.g., see computing devices 104a and 104b as well as mobile devices 105a and 105b). The method 300 begins, at step 302, with hosting, by a first computing device (or the computing device), a master version of an ANN.

At step 304, the first computing device hosts a master version of a feature dictionary.

At step 306, the first computing device receives a local version of a feature dictionary from a second computing device which is one of the other computing devices hosting other versions of the ANN and the feature dictionary.

At step 308, the first computing device changes the master version of the feature dictionary based on the received local version of the feature dictionary.

At step 310, the first computing device receives encoded features from the second computing device. The received encoded features can be encoded by the second computing device according to a local version of the feature dictionary hosted by the second computing device.

At step 312, the first computing device decodes the received encoded features according to the master version of the feature dictionary. The decoding can include decoding the encoded features according to the changed master version of the feature dictionary.

At step 314, the first computing device trains the master version of the ANN based on the decoded features using machine learning.

At step 316, the first computing device transmits the trained master version of the ANN to the second computing device.

At step 318, the first computing device transmits the changed master version of the feature dictionary to the second computing device.

FIG. 4 shows the method 400 performed by a computing device configured to host another version of the ANN other than the master version of the ANN (such as a local version) and use of a local feature dictionary for assisting with centralized training of the ANN and reduction of data transmission (e.g., see computing devices 104a and 104b as well as mobile devices 105a and 105b) that is in communication with the first computing device that can perform the method 300 (e.g., see first computing device 108 or cloud computing environment 109). The method 400 begins, at step 402, with hosting, by the second computing device, a local version of the ANN.

At step 404, the second computing device hosts a local version of the feature dictionary.

At step 406, the second computing device extracts features from user data hosted by the second computing device.

At step 408, the second computing device determines whether the extracted features are included in the local version of the feature dictionary. In response to the local version of the feature dictionary including the extracted features, the second computing device encodes the extracted features according to the local version of the feature dictionary, at step 412. In response to the local version of the feature dictionary not including the extracted features, the second computing device changes the local version of the feature dictionary based on the extracted features, at step 410, and then encodes the extracted features according to the changed local version of the feature dictionary, at step 412.

At step 414, the second computing device transmits the encoded features to the first computing device that hosts a master version of the ANN so that the encoded features are decoded by the master version of the feature dictionary hosted by the first computing device and then used as input to train the master version of the ANN using machine learning.

At step 416, the second computing device transmits the changed local version of the feature dictionary to the first computing device so that the master version of the feature dictionary is changed according to the local version of the feature dictionary.

At step 418, the second computing device receives the trained master version of the ANN. And, at step 420, the second computing device changes the local version of the ANN based on the trained master version of the ANN.

At step 422, the second computing device receives a changed master version of the feature dictionary that was changed according to the local version of the feature dictionary. And, at step 424, the second computing device changes the local version of the feature dictionary based on the changed master version of the feature dictionary.

Figure 5:
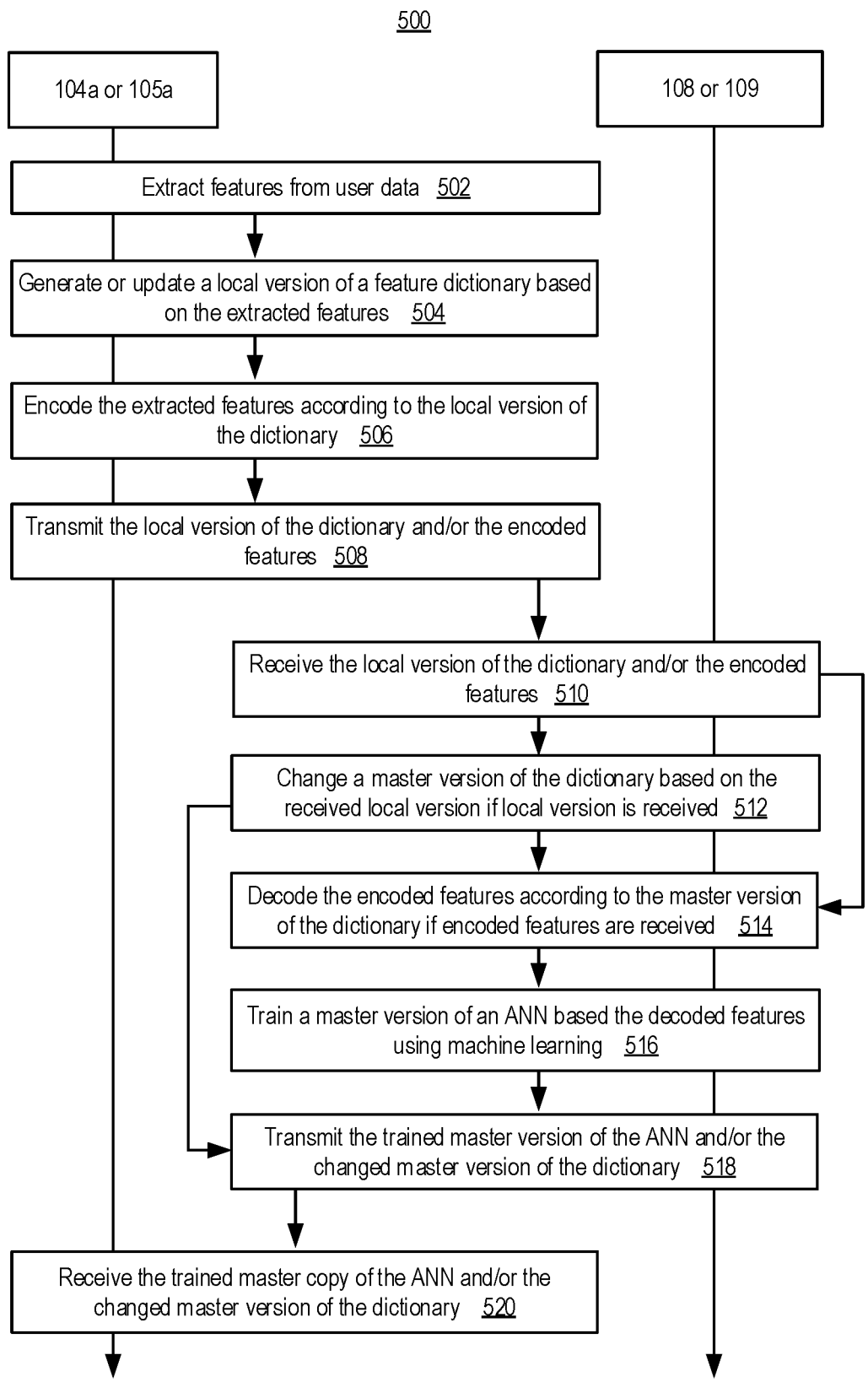

FIG. 5 shows the method 500 performed by computing devices configured to host and execute a master version of an ANN (e.g., see first computing device 108 and cloud computing environment 109 depicted in FIGS. 1 and 2 respectively) and computing devices configured to host and execute other versions of the ANN (e.g., see computing devices 104*a* and 104*b* or mobile devices 105*a* and 105*b*). Method 500 can include the operations of methods 300 and 400.

The method 500 begins, at step 502, with a computing device configured to host another version of the ANN besides the master version of the ANN (i.e., the second computing device) extracting features from user data stored in memory of the second computing device. At step 504, the second computing device (e.g., see computing devices 104*a* and 104*b* or mobile devices 105*a* and 105*b*) generates a local version of a feature dictionary based on the extracted features, if no feature dictionary exists on the second computing device after an initial extraction at step 502. Otherwise, at step 504, the second computing device updates a local version of the feature dictionary based on the extracted features from the user data. At step 506, the second computing device encodes the extracted features according to the local version of the feature dictionary.

At step 508, the second computing device transmits the local version of the feature dictionary to a computing device configured to host a master version of the ANN (i.e., a first computing device). The second computing device can be configured to transmit the local version of the feature dictionary to the first computing device only when the local version has been initially generated or when the local version has been updated. Also, when the local version of the feature dictionary is updated, the second computing device can be configured to only transmit the updated portions of the feature dictionary to the first computing device. Also, at step 508, the second computing device transmits the encoded features. The second computing device can be configured to only send the recently encoded features.

At step 510, the first computing device receives the local version of the dictionary if it was sent from the second computing device. Also, at step 510, the first computing device receives the encoded features if the encoded features were sent from the second computing device. At step 512, the first computing device changes the master version of the feature dictionary based on the received local version of the feature dictionary if the local version of the dictionary is received. The receiving of the local version can trigger the changing of the master version of the dictionary.

At step 514, the first computing device decodes the encoded features according to the master version of the dictionary if the encoded features are received. The receiving of the encoded features can trigger the decoding of the encoded features.

At step 516, the first computing device trains the master version of the ANN based on the decoded features using machine learning. And, at step 518, the first computing device transmits the trained master version of the ANN and/or the changed master version of the dictionary to the second computing device. A step 520, the second computing device receives the trained master copy of the ANN and/or receives the changed master version of the dictionary according to the events that occur at step 518.

Not shown in FIG. 5, the local version of the ANN can be trained or re-trained by combining the updated master version with a present local version of the ANN in the user device. And, the combining in the training or re-training can include updates to neuron attributes of the local version of the ANN according to averaging corresponding attributes of the updated master version of the ANN and the "present" or previous local version of the ANN.

For the purposes of steps 502 to 520 of FIG. 5 and this disclosure, it is to be understood that updates to the local version of the feature dictionary and encoded user data (e.g., see dictionary updates/encoded features 126*a* and 126*b*) that are transmitted, at step 508, from the user devices (e.g., see computing devices 104*a* and 104*b* or mobile devices 105*a* and 105*b* shown in FIG. 2) to the central device, server, or cloud (e.g., see first computing device 108 or cloud computing environment 109) hosting the master version of the ANN can be in or derived from the form of the entire extracted features extracted in step 502 or parts of the extracted features extracted in step 502. Also, in some embodiments, the central device, server, or cloud hosting the master version of the ANN can limit what the user devices can extract at step 502 and generate and encode at steps 504 and 506 respectively to adjust the network performance provided by the encoding and possibly obfuscation as well as on the other hand adjust the accuracy of the training of the version of the ANN (such as the master version) using the encoded and sometimes obfuscated user data as input for the training.

Also, it is to be understood that a peer-to-peer network can implement the method 500. In such examples, a first selected device hosts the master version of the ANN for processing and the other devices of the peer-to-peer network host the other versions (e.g., local versions) of the ANN for processing. In such examples, the first selected device executes steps 510 to 518 and the other devices of the peer-to-peer network execute steps 502 to 508 and 520.

With respect to the method 300, method 400, method 500 or any other method, process, or operation described herein, in some embodiments, a non-transitory computer-readable storage medium stores instructions that, when executed by at least one processing device (such as processor 606 shown in FIG. 6), cause the at least one processing device to perform the method 300, method 400, method 500 or any other method, process, or operation described herein, and/or any combination thereof.

Figure 6:
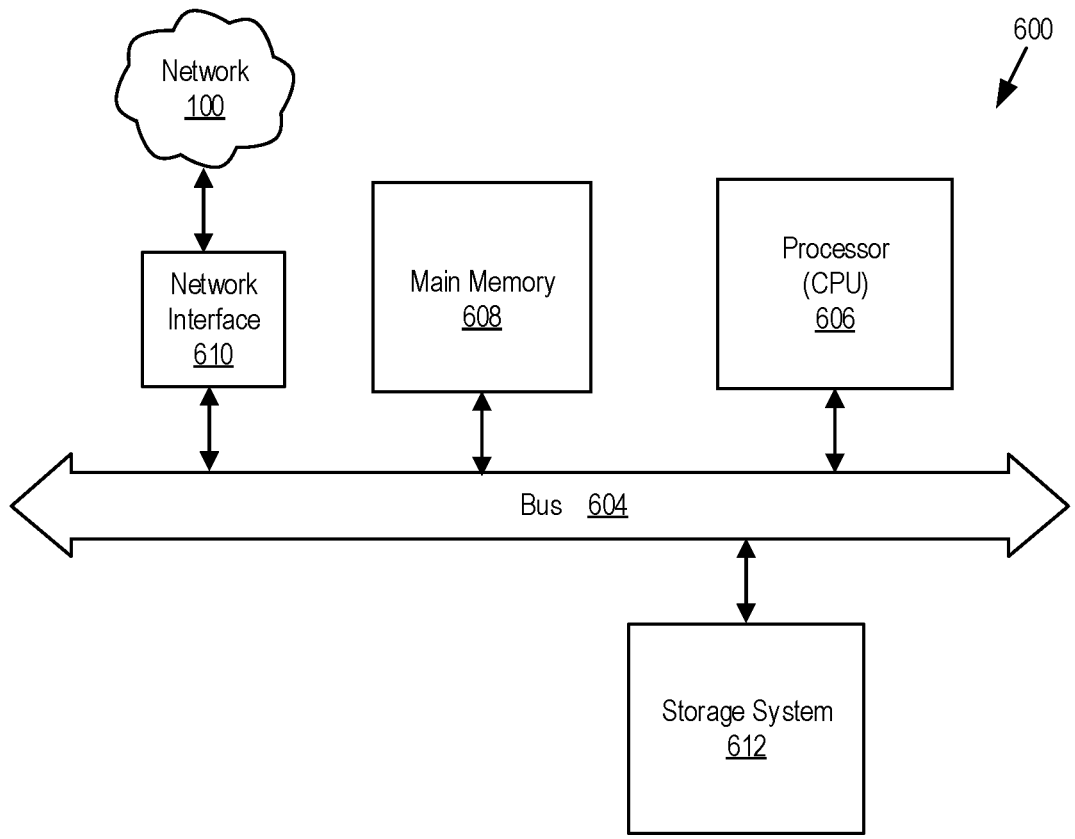
FIG. 6 illustrates an example computing device that can host master versions of the ANN and the feature dictionary or an example computing device that can host other versions of the ANN and the feature dictionary, in accordance with some embodiments of the present disclosure.

FIG. 6 illustrates example parts of an example computing device 600, in accordance with some embodiments of the present disclosure. The computing device 600 can be communicatively coupled to other computing devices via the computer network 100 as shown in FIG. 6. In some embodiments, computing device 600 is the first computing device 108 or one or more computing devices of the cloud computing environment 109. In such embodiments, another instance of the computing device 600 is one of the computing devices of the set of computing devices 102 (e.g., see computing devices 104a and 104b and mobile devices 105a and 105b). The computing device 600 includes at least a bus 604, a processor 606 (such as a CPU), a main memory 608, a network interface 610, and a data storage system 612. The bus 604 communicatively couples the processor 606, the main memory 608, the network interface 610, and the data storage system 612. The computing device 600 includes a computer system that includes at least processor 606, main memory 608 (e.g., read-only memory (ROM), flash memory, dynamic random access memory (DRAM) such as synchronous DRAM (SDRAM) or Rambus DRAM (RDRAM), static random access memory (SRAM), etc.), and data storage system 612, which communicate with each other via bus 604 (which can include multiple buses).

To put it another way, FIG. 6 is a block diagram of an example computing device 600 having a computer system in which embodiments of the present disclosure can operate. In some embodiments, the computer system can include a set of instructions, for causing a machine to perform any one or more of the methodologies discussed herein, when executed. In such embodiments, the machine can be connected (e.g., networked via network interface 610) to other machines in a LAN, an intranet, an extranet, and/or the Internet. The machine can operate in the capacity of a server or a client machine in client-server network environment, as a peer machine in a peer-to-peer (or distributed) network environment (such as the peer-to-peer networks described herein), or as a server or a client machine in a cloud computing infrastructure or environment.

Processor 606 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processor 606 can also be one or more special-purpose processing devices such as an application specific integrated circuit (ASIC), a field programmable gate array (FPGA), a digital signal processor (DSP), network processor, a processor in memory (PIM), or the like. Processor 606 is configured to execute instructions for performing the operations and steps discussed herein. Processor 606 can further include a network interface device such as network interface 610 to communicate over one or more communications network.

The data storage system 612 can include a machine-readable storage medium (also known as a computer-readable medium) on which is stored one or more sets of instructions or software embodying any one or more of the methodologies or functions described herein. The instructions can also reside, completely or at least partially, within the main memory 608 and/or within the processor 606 during execution thereof by the computer system, the main memory 608 and the processor 606 also constituting machine-readable storage media. While the memory, processor, and data storage parts are shown in the example embodiment to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

The peer-to-peer network of some embodiments can be a collection of nodes and peer-to-peer connections. For example, the first computing device 108 or one of computing devices of the set of computing devices 102 can be a node of a peer-to-peer network supported by computing devices connected through computer network 100.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
hosting, by a first computing device, a master version of an artificial neural network (ANN);
hosting, by the first computing device, a master version of a feature dictionary;
receiving, by the first computing device, encoded features from a second computing device, wherein the received encoded features are encoded by the second computing device according to a local version of the feature dictionary hosted by the second computing device;
decoding, by the first computing device, the received encoded features according to the master version of the feature dictionary; and
training, by the first computing device, the master version of the ANN based on the decoded features using machine learning;
wherein, in response to the local version of the feature dictionary of the second computing device not including features extracted from user data hosted by the second computing device, the local version of the feature dictionary is changed to be based on the extracted features and the extracted features are encoded according to the changed local version of the feature dictionary.

2. The method of claim 1, comprising transmitting, by the first computing device, the trained master version of the ANN to the second computing device.

3. The method of claim 1, comprising receiving, by the first computing device, the local version of the feature dictionary from the second computing device.

4. The method of claim 3, comprising changing, by the first computing device, the master version of the feature dictionary based on the received local version of the feature dictionary.

5. The method of claim 4, wherein the decoding comprises decoding the encoded features according to the changed master version of the feature dictionary.

6. The method of claim 1, comprising transmitting, by the first computing device, the changed master version of the feature dictionary to the second computing device.

7. A method, comprising:
hosting, by a second computing device, a local version of an artificial neural network (ANN);
hosting, by the second computing device, a local version of a feature dictionary;
extracting, by the second computing device, features from user data hosted by the second computing device;
determining, by the second computing device, whether the extracted features are included in the local version of the feature dictionary;
in response to the local version of the feature dictionary including the extracted features, encoding, by the second computing device, the extracted features according to the local version of the feature dictionary;
in response to the local version of the feature dictionary not including the extracted features, changing the local version of the feature dictionary based on the extracted features and encoding the extracted features according to the changed local version of the feature dictionary; and
transmitting, by the second computing device, the encoded features to a first computing device that hosts a master version of the ANN so that the encoded features are decoded by a master version of the feature dictionary hosted by the first computing device and then used as input to train the master version of the ANN using machine learning.

8. The method of claim 7, comprising:
transmitting the changed local version of the feature dictionary to the first computing device so that the master version of the feature dictionary is changed according to the local version of the feature dictionary.

9. The method of claim 8, comprising:
receiving a changed master version of the feature dictionary that was changed according to the local version of the feature dictionary; and
changing the local version of the feature dictionary based on the changed master version of the feature dictionary.

10. The method of claim 7, comprising:
receiving the trained master version of the ANN; and
changing the local version of the ANN based on the trained master version of the ANN.

11. A system, comprising:
a first computing device comprising:
memory configured to:
store a master version of an artificial neural network (ANN); and
store a master version of a feature dictionary;
transceiver configured to receive encoded features from a second computing device; and
a processor configured to:
decode the received encoded features according to the master version of the feature dictionary; and
train the master version of the ANN based on the decoded features using machine learning; and
the second computing device comprises:
memory configured to:
store user data;
store a local version of the ANN; and
store the local version of the feature dictionary;
a processor configured to:
extract features from the stored user data; and
encode the extracted features according to the local version of the feature dictionary; and a transceiver configured to transmit the encoded features to the first computing device so that the encoded features are decoded by the master version of the feature dictionary and then used as input to train the master version of the ANN using the machine learning.

12. The system of claim 11, wherein the transceiver of the first computing device is configured to transmit the trained master version of the ANN to the second computing device.

13. The system of claim 11, wherein the transceiver of the first computing device is configured to receive the local version of the feature dictionary from the second computing device, and wherein the processor of the first computing device is configured to:

change the master version of the feature dictionary based on the received local version of the feature dictionary; and decode the received encoded features according to the changed master version of the feature dictionary.

14. The system of claim 13, wherein the transceiver of the first computing device is configured to transmit the changed master version of the feature dictionary to the second computing device.

15. The system of claim 11, wherein the processor of the second computing device is further configured to:

determine whether the extracted features are included in the local version of the feature dictionary;

in response to the local version of the feature dictionary including the extracted features, encode the extracted features according to the local version of the feature dictionary; and in response to the local version of the feature dictionary not including the extracted features, change the local version of the feature dictionary based on the extracted features and then encode the extracted features according to the changed local version of the feature dictionary.

16. The system of claim 15, wherein the transceiver of the second computing device is configured to transmit the changed local version of the feature dictionary to the first computing device so that the master version of the feature dictionary is changed according to the local version of the feature dictionary.

17. The system of claim 16, wherein the transceiver of the second computing device is configured to receive the changed master version of the feature dictionary, and wherein the processor of the second computing device is configured to change the local version of the feature dictionary based on the changed master version of the feature dictionary.

18. The system of claim 11, wherein the transceiver of the second computing device is configured to receive the trained master version of the ANN, and wherein the processor of the second computing device is configured to change the local version of the ANN based on the trained master version of the ANN.

* * * * *